(12) United States Patent
Aoki et al.

(10) Patent No.: US 6,736,990 B2
(45) Date of Patent: May 18, 2004

(54) FERRITE MATERIAL

(75) Inventors: Takuya Aoki, Tokyo (JP); Ko Ito, Tokyo (JP); Bungo Sakurai, Tokyo (JP); Yukio Takahashi, Tokyo (JP); Tatsuya Shimazaki, Tokyo (JP); Hidenobu Umeda, Tokyo (JP); Akinori Ohi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/069,952

(22) PCT Filed: Aug. 3, 2001

(86) PCT No.: PCT/JP01/06692

§ 371 (c)(1),
(2), (4) Date: Mar. 7, 2002

(87) PCT Pub. No.: WO02/16268

PCT Pub. Date: Feb. 28, 2002

(65) Prior Publication Data

US 2002/0175311 A1 Nov. 28, 2002

(30) Foreign Application Priority Data

| Aug. 21, 2000 | (JP) | ......................... | 2000-249240 |
| Aug. 28, 2000 | (JP) | ......................... | 2000-256797 |
| Aug. 28, 2000 | (JP) | ......................... | 2000-256798 |

(51) Int. Cl.$^7$ .......................... H01F 1/34; C04B 35/30; C01G 49/00
(52) U.S. Cl. ................. 252/62.6; 252/62.62; 252/62.59
(58) Field of Search ............................ 252/62.6, 62.62, 252/62.59

(56) References Cited

U.S. PATENT DOCUMENTS

| 5,711,893 A | * | 1/1998 | Park ........................ 252/62.62 |
| 6,210,597 B1 | * | 4/2001 | Murase et al. ............. 252/62.6 |
| 6,558,566 B2 | * | 5/2003 | Ono et al. ................. 252/62.6 |
| 6,558,807 B2 | * | 5/2003 | Ito et al. ..................... 428/472 |

FOREIGN PATENT DOCUMENTS

| JP | 63-169005 | | 7/1988 |
| JP | 01-228108 | * | 9/1989 |
| JP | 1-228108 | | 9/1989 |
| JP | 8-325056 | | 12/1996 |
| JP | 08-325056 | * | 12/1996 |
| JP | 2679716 | | 8/1997 |
| JP | 2000-133509 | | 5/2000 |

\* cited by examiner

*Primary Examiner*—C. Melissa Koslow
(74) *Attorney, Agent, or Firm*—Oblon, Spivak, McClelland, Maier & Neustadt, P.C.

(57) ABSTRACT

There can be provided an NiCuZn-based ferrite material containing an iron oxide, a copper oxide, zinc oxide and a nickel oxide in predetermined amounts as main components and a bismuth oxide, a silicon oxide, magnesium oxide and a cobalt oxide in predetermined amounts as additional components. Due to the predetermined amounts of the additional components, the ferrite material has an extremely good temperature characteristic (a change in permeability along with a change in temperature is small), a high quality coefficient Q and high strength.

24 Claims, No Drawings

FERRITE MATERIAL

TECHNICAL FIELD

A first group invention of the present invention relates to an NiCuZn-based ferrite material having an initial permeability $\mu i$ of not lower than 200, particularly to a ferrite material having good temperature dependence of initial permeability, a high quality coefficient Q and high strength. The ferrite material of the present invention can be suitably used in, for example, a resin-mold-type ferrite component.

Further, a second group invention of the present invention relates to an NiCuZn-based ferrite material having an initial permeability $\mu i$ of not higher than 100, particularly to a ferrite material having good temperature dependence of initial permeability, a high quality coefficient Q and high strength. The ferrite material of the present invention can be suitably used in, for example, a resin-mold-type ferrite component.

Still further, a third group invention of the present invention relates to an NiCuZn-based ferrite material as described above, particularly to a ferrite material used in a resin-mold-type ferrite component.

BACKGROUND ART (1) In recent years, demands for components such as resin-mold-type chip inductor and stationary coil are rapidly growing in the fields of a television, a video recorder, a mobile communication device and the like. The products in such fields are demanded to have such characteristics as a small size, light weight and high accuracy, and along with the demand, demands for a decrease in tolerance and an increase in reliability to the above components are growing.

Meanwhile, a ferrite is commonly used in the core material of these components. In the case of a resin-mold-type inductor component, a compressive stress is produced in the core by resin molding, and the inductance value of the ferrite changes according to this compressive stress. Therefore, it is difficult to obtain a high-quality resin-mold-type inductor component having small inductance tolerance.

Under the circumstances, a ferrite which undergoes a small change in inductance when an external force is applied, that is, a ferrite having good stress resistance is desired. Further, to increase the reliability of a device using an inductance component, it is important to increase the reliability of the inductance component itself, specifically, to decrease the temperature dependence of initial permeability of the ferrite used in the inductance component.

In response to such a demand, a variety of improvement techniques in this field have heretofore been made. That is, in Japanese Patent Application Laid-Open No. 326243-1993, an NiCuZn-based ferrite containing 0.05 to 0.60 wt % of $Co_3O_4$, 0.5 to 2 wt % of $Bi_2O_3$ and 0.10 to 2.00 wt % of a combination of $SiO_2$ and $SnO_2$ is proposed. However, since the NiCuZn-based ferrite contains a small amount of ZnO, a high initial permeability of not lower than 200 cannot be obtained.

Further, in Japanese Patent No. 267916, an NiCuZn-based ferrite containing 0.05 to 0.60 wt % of $Co_3O_4$, 3 to 5 wt % of $Bi_2O_3$ and 0.10 to 2.00 wt % of $SiO_2$ is proposed. However, since the NiCuZn-based ferrite contains a small amount of ZnO, a high initial permeability of not lower than 200 cannot be obtained.

Further, in Japanese Patent Application Laid-Open No. 103953-1989, an NiZn based ferrite containing 0.05 to 2 wt % of $Bi_2O_3$, 0 to 1 wt % of $SiO_2$ and MgO or an oxide of Mn is proposed. Although the NiZn based ferrite has improved heat shock resistance, its temperature dependence of initial permeability cannot be said to be satisfactory.

Further, in Japanese Patent Application Laid-Open No. 228108-1989, an NiCuZn-based ferrite containing $SiO_2$ in an amount of 0.03 wt % or less, MnO in an amount of 0.1 wt % or less, $Bi_2O_3$ in an amount of 0.1 wt % or less and MgO in an amount of 0.1 wt % or less to form a structure for alleviating the stress is proposed. However, since the NiCuZn-based ferrite contains a small amount of $Bi_2O_3$, its stress resistance cannot be said to be satisfactory.

Further, in Japanese Patent Application Laid-Open No. 325056-1996, an NiZn based ferrite material containing CoO, $Bi_2O_3$ and $SiO_2$ to make a change in inductance under a load extremely small and increase a Q value at high frequency is disclosed.

However, as seen in the example disclosed in the gazette, the main composition of the example is out of the range of the main composition of the present invention and does not include MgO of the present invention. Therefore, the value of a quality coefficient Q is liable to be low.

In addition, in the case of a conventional NiCuZn ferrite containing $Bi_2O_3$ and having high initial permeability, since its grain size diameter is large, a temperature coefficient is low and the Q is high, so that a ferrite component having high strength cannot be obtained.

(2) As described above, in recent years, demands for components such as resin-mold-type chip inductor and stationary coil are rapidly growing in the fields of a television, a video recorder, a mobile communication device and the like. The products in such fields are demanded to have such characteristics as a small size, light weight and high accuracy, and along with the demand, demands for a decrease in tolerance and an increase in reliability to the above components are growing.

Meanwhile, a ferrite is commonly used in the core material of these components. In the case of a resin-mold-type inductor component, a compressive stress is produced in the core by resin molding, and the inductance value of the ferrite changes according to this compressive stress. Therefore, it is difficult to obtain a high-quality resin-mold-type inductor component having small inductance tolerance.

Under the circumstances, a ferrite which undergoes a small change in inductance when an external force is applied, that is, a ferrite having good stress resistance is desired. Further, to increase the reliability of a device using an inductance component, it is important to increase the reliability of the inductance component itself, specifically, to decrease the temperature dependence of initial permeability of the ferrite used in the inductance component.

In response to such a demand, a variety of improvement techniques in this field have heretofore been made. That is, in Japanese Patent Application Laid-Open No. 326243-1993, an NiCuZn-based ferrite containing 0.05 to 0.60 wt % of $Co_3O_4$, 0.5 to 2 wt % of $Bi_2O_3$ and 0.10 to 2.00 wt % of a combination of $SiO_2$ and $SnO_2$ is proposed. However, although the NiCuZn-based ferrite has improved stress resistance, Q is low and its temperature dependence of initial permeability is not satisfactory, either.

Further, in Japanese Patent No. 267916, an NiCuZn-based ferrite containing 0.05 to 0.60 wt % of $Co_3O_4$, 3 to 5 wt % of $Bi_2O_3$ and 0.10 to 2.00 wt % of $SiO_2$ is proposed. However, as in the case of the above ferrite, its temperature dependence of initial permeability cannot be said to be satisfactory and its quality coefficient Q is also low.

Further, in Japanese Patent Application Laid-Open No. 103953-1989, an NiZn based ferrite containing 0.05 to 2 wt % of $Bi_2O_3$, 0 to 1 wt % of $SiO_2$ and MgO or an oxide of Mn is proposed. Although the NiZn based ferrite has improved heat shock resistance, its temperature dependence of initial permeability cannot be said to be satisfactory and its quality coefficient Q is also low.

Further, in Japanese Patent Application Laid-Open No. 228108-1989, an NiCuZn based ferrite containing $SiO_2$ in an amount of 0.03 wt % or less, MnO in an amount of 0.1 wt % or less, $Bi_2O_3$ in an amount of 0.1 wt % or less and MgO in an amount of 0.1 wt % or less to form a structure for alleviating the stress is proposed. However, since the NiCuZn-based ferrite contains a small amount of $Bi_2O_3$, neither sufficient strength nor sufficient temperature dependence of initial permeability is obtained.

Further, in Japanese Patent Application Laid-Open No. 325056-1996, an NiZn based ferrite material containing CoO, $Bi_2O_3$ and $SiO_2$ to make a change in inductance under a load extremely small and increase the Q value at high frequency is disclosed.

However, as seen in the example disclosed in the gazette, the main composition of the example is out of the range of the main composition of the present invention and does not include MgO of the present invention. Therefore, the value of the quality coefficient Q is liable to be low.

(3) A nickel-based ferrite material (such as an NiCuZn-based ferrite, NiCu-based ferrite or Ni-based ferrite) is widely used as an inductor element. Meanwhile, along with rapid developments in the fields of information and telecommunication and high frequency in recent years, demand for an improvement in the performance of a resin-mold-type inductor element or the like.

When the resin-mold-type inductor element is prepared, a ferrite material is molded into a resin, and a compressive stress is exerted on the ferrite material when the resin is cured. Since the inductance value of the ferrite material changes according to the degree of the compressive stress, a ferrite material which exhibits a small inductance change caused by the compressive stress and has excellent stress resistance is desired for the resin-mold-type inductor element. As for the improvements in the performance of the inductor element, a gentle change in permeability along with a change in temperature and a large Q value which is a quality coefficient in a frequency band used are desired.

To respond to such desires, an NiCuZn-based ferrite material containing cobalt oxide, bismuth oxide and silicon oxide is disclosed in Japanese Patent No. 2679716, Japanese Patent Application Laid-Open No. 326243-1993 and the like. Further, an NiZn-based ferrite material containing bismuth oxide and silicon oxide to have heat shock resistance improved is disclosed in Japanese Patent Application Laid-Open No. 103953-1989, and an NiCuZn-based ferrite material containing silicon oxide, manganese oxide, bismuth oxide and magnesium oxide to have a stress-alleviating structure is disclosed in Japanese Patent Application Laid-Open No. 228108-1989. Further, a heat-shock-resistant ferrite material having an average grain size diameter of crystal structure of 20 to 60 $\mu$m is disclosed in Japanese Patent Application Laid-Open No. 323806-1992, and an NiCuZn-based ferrite material containing 2.1 to 10.0 wt % of silicon oxide is disclosed in Japanese Patent Application Laid-Open No. 325056-1996.

However, the above NiCuZn-based ferrite material disclosed in Japanese Patent No. 2679716 and Japanese Patent Application Laid-Open No. 326243-1993 contains zinc oxide in a small amount of 2 to 30 mol %, so that high initial permeability $\mu i$ cannot be obtained. Further, the NiZn based ferrite material disclosed in Japanese Patent Application Laid-Open No. 103953-1989 contains a small amount of cobalt oxide, so that a change in permeability along with a change in temperature is large, and the NiCuZn-based ferrite material disclosed in Japanese Patent Application Laid-Open No. 228108-1989 contains bismuth oxide in an amount of 0.1 wt % or less, so that its stress resistance is not satisfactory. Further, the heat-shock-resistant ferrite material disclosed in Japanese Patent Application Laid-Open No. 323806-1992 has a large average grain size diameter of crystal structure of 20 to 60 $\mu$m, so that a change in permeability along with a change in temperature is large, and the NiCuZn-based ferrite material disclosed in Japanese Patent Application Laid-Open No. 325056-1996 contains a large amount of silicon oxide, so that a change in permeability along with a change in temperature is large.

Therefore, a ferrite material having high initial permeability, excellent stress resistance and a low absolute value of temperature coefficient is desired.

DISCLOSURE OF THE INVENTION

The present invention has been invented to solve the above problems of the prior art.

That is, the first group invention of the present invention has been invented for solving the problem in the above (1) of the prior art. An object thereof is to solve the problem of the above (1) and provide an NiCuZn-based ferrite material having a high initial permeability of not lower than 200, good temperature dependence of initial permeability, a high quality coefficient Q and high strength.

To achieve such an object, the present invention is an NiCuZn-based ferrite material containing, as main components, an iron oxide in an amount of 47.0 to 50.0 mol % in terms of $Fe_2O_3$, a manganese oxide in an amount of 0.3 to 1.5 mol % in terms of $Mn_2O_3$, a copper oxide in an amount of 2.0 to 8.0 mol % in terms of CuO, zinc oxide in an amount of 30.1 to 33.0 mol % in terms of ZnO and a nickel oxide (NiO) in mol % as the balance, wherein 0.5 to 6.0 wt % of bismuth oxide in terms of $Bi_2O_3$, 0.1 to 2.0 wt % of silicon oxide in terms of $SiO_2$ and 0.05 to 1.0 wt % of magnesium oxide in terms of MgO are further contained in addition to the main components.

Further, the present invention is an NiCuZn-based ferrite material containing, as main components, an iron oxide in an amount of 47.0 to 50.0 mol % in terms of $Fe_2O_3$, a manganese oxide in an amount of 0.3 to 1.5 mol % in terms of $Mn_2O_3$, a copper oxide in an amount of 2.0 to 8.0 mol % in terms of CuO, zinc oxide in an amount of 30.1 to 33.0 mol % in terms of ZnO and a nickel oxide (NiO) in mol % as the balance, wherein 0.5 to 6.0 wt % of bismuth oxide in terms of $Bi_2O_3$ and 0.15 to 3.2 wt % of talc are further contained in addition to the main components.

Further, the present invention has an initial permeability $\mu i$ at a frequency of 100 kHz of not lower than 200.

The second group invention of the present invention has been invented for solving the problem in the above (2) of the prior art. An object thereof is to solve the problem of the above (2) and provide an NiCuZn-based ferrite material which undergoes an extremely small change in inductance when an external force is applied and which has excellent stress resistance, good temperature dependence of initial permeability and a high quality coefficient Q.

To achieve such an object, the present invention is an NiCuZn-based ferrite material containing, as main components, an iron oxide in an amount of 47.0 to 50.0 mol % in terms of $Fe_2O_3$, a manganese oxide in an amount of 0.01 to 3.0 mol % in terms of $Mn_2O_3$, a copper oxide in an amount of 0.5 to 4.9 mol % in terms of CuO, zinc oxide in an amount of 1.0 to 23.0 mol % in terms of ZnO and a nickel oxide in mol % in terms of NiO as the balance, wherein 0.02 to 1.0 wt % of cobalt oxide in terms of CoO, 0.5 to 10.0 wt % of bismuth oxide in terms of $Bi_2O_3$, 0.1 to 2.0 wt % of silicon oxide in terms of $SiO_2$ and 0.05 to 1.0 wt % of magnesium oxide in terms of MgO are further contained in addition to the main components.

Further, the present invention is an NiCuZn-based ferrite material containing, as main components, an iron oxide in an amount of 47.0 to 50.0 mol % in terms of $Fe_2O_3$, a manganese oxide in an amount of 0.01 to 3.0 mol % in terms of $Mn_2O_3$, a copper oxide in an amount of 0.5 to 4.9 mol % in terms of CuO, zinc oxide in an amount of 1.0 to 23.0 mol % in terms of ZnO and a nickel oxide in mol % in terms of NiO as the balance, wherein 0.02 to 1.0 wt % of cobalt oxide in terms of CoO, 0.5 to 10.0 wt % of bismuth oxide in terms of $Bi_2O_3$ and 0.15 to 3.2 wt % of talc are further contained in addition to the main components.

Further, the present invention has an initial permeability $\mu i$ at a frequency of 100 kHz of not higher than 100.

The third group invention of the present invention has been invented for solving the problem in the above (3) of the prior art. An object thereof is to provide an inexpensive ferrite material which has high initial permeability and excellent stress resistance and which exhibits a small inductance change caused by a compressive stress and a gentle change in permeability along with a change in temperature.

To achieve such an object, the ferrite material of present invention is a ferrite material containing an iron oxide, a copper oxide, zinc oxide and a nickel oxide as main components, wherein the iron oxide is contained in an amount of 46.0 to 49.0 mol % in terms of $Fe_2O_3$, the copper oxide is contained in an amount of 4.0 to 11.0 mol % in terms of CuO, the zinc oxide is contained in an amount of 30.1 to 33.0 mol % in terms of ZnO and the nickel oxide is contained as the balance, and in addition to these main components, 0.005 to 0.03 wt % of cobalt oxide in terms of CoO, 0.1 to 0.5 wt % of bismuth oxide in terms of $Bi_2O_3$, 0.1 to 0.6 wt % of silicon oxide in terms of $SiO_2$ and 0.05 to 1.0 wt % of magnesium oxide in terms of MgO are further contained as additional components.

Further, the ferrite material of the present invention is a ferrite material containing an iron oxide, a copper oxide, zinc oxide and a nickel oxide as main components, wherein the iron oxide is contained in an amount of 46.0 to 49.0 mol % in terms of $Fe_2O_3$, the copper oxide is contained in an amount of 4.0 to 11.0 mol % in terms of CuO, the zinc oxide is contained in an amount of 30.1 to 33.0 mol % in terms of ZnO and the nickel oxide is contained as the balance, and in addition to these main components, 0.005 to 0.03 wt % of cobalt oxide in terms of CoO, 0.1 to 0.5 wt % of bismuth oxide in terms of $Bi_2O_3$ and 0.1 to 2.0 wt % of talc are further contained as additional components.

Further, the above ferrite material has an initial permeability at a frequency of 100 kHz of not lower than 200.

Further, the above ferrite material has a relative coefficient of temperature dependence of initial permeability in a range of ±5 (ppm/° C.).

In addition, the above ferrite material has a rate of change in inductance under a pressure of 98 MPa in a range of ±5%.

BEST MODE OF EMBODYING THE INVENTION

A detailed description will be given to the embodiments of the present invention hereinafter.

(1) Description of the Invention of the First Invention Group

A detailed description will be given to the ferrite material of the present invention hereinafter. The ferrite material of the present invention contains, as its substantial main components, an iron oxide in an amount of 47.0 to 50.0 mol % (particularly preferably 47.5 to 49.5 mol %) in terms of $Fe_2O_3$, a manganese oxide in an amount of 0.3 to 1.5 mol % (particularly preferably 0.3 to 1.2 mol %) in terms of $Mn_2O_3$, a copper oxide in an amount of 2.0 to 8.0 mol % (particularly preferably 3.0 to 7.0 mol %) in terms of CuO, zinc oxide in an amount of 30.1 to 33.0 mol % (particularly preferably 30.1 to 32.0 mol %) in terms of ZnO and a nickel oxide in mol % in terms of NiO as the balance.

Further, the ferrite material of the present invention also contains a bismuth oxide in an amount of 0.5 to 6.0 wt % (particularly preferably 0.5 to 5.0 wt %) in terms of $Bi_2O_3$, a silicon oxide in an amount of 0.1 to 2.0 wt % (particularly preferably 0.15 to 1.5 wt %) in terms of $SiO_2$ and a magnesium oxide in an amount of 0.05 to 1.0 wt % (particularly preferably 0.05 to 0.8 wt %) in terms of MgO, in addition to the above main components.

Talc contains Si and Mg in predetermined proportions as sintering components. Therefore, talc can be added in place of the above $SiO_2$ and MgO. In that case, to satisfy the above amounts of $SiO_2$ and MgO, talc is added in an amount of 0.15 to 3.2 wt %.

In the above composition, when the content of $Fe_2O_3$ is lower than 47 mol %, the inconvenience that initial permeability lowers occurs, while when the content of $Fe_2O_3$ is higher than 50.0 mol %, the inconvenience that a quality coefficient Q becomes smaller occurs. When the content of $Mn_2O_3$ is lower than 0.3 mol %, the inconvenience that the initial permeability lowers occurs, while when the content of $Mn_2O_3$ is higher than 1.5 mol %, the inconvenience that the quality coefficient Q becomes smaller occurs. When the content of CuO is lower than 2.0 mol %, the inconvenience that the initial permeability lowers occurs, while when the content of CuO is higher than 8.0 mol %, the inconvenience that the quality coefficient Q becomes smaller occurs.

When the content of ZnO is lower than 30.1 mol %, the inconvenience that the initial permeability lowers occurs, while when the content of ZnO is higher than 33.0 mol %, the inconvenience that a Curie point becomes lower is liable to occur.

When the content of $Bi_2O_3$ is lower than 0.5 wt %, a sintered density becomes lower, so that the inconvenience that the strength of a sintered body lowers occurs. On the other hand, when the content of $Bi_2O_3$ is higher than 6.0 wt %, the inconvenience that the quality coefficient Q becomes smaller is liable to occur.

When the content of $SiO_2$ is lower than 0.1 wt %, the quality coefficient Q is liable to become smaller, while when the content of $SiO_2$ is higher than 2.0 wt %, the initial permeability is liable to lower.

When the content of MgO is lower than 0.05 wt %, the quality coefficient Q is liable to become smaller, while when the content of MgO is higher than 2.0 wt %, the initial permeability is liable to lower.

As for the case where the above $SiO_2$ and MgO are substituted by talc, when the content of talc is lower than 0.15 wt %, the quality coefficient Q is liable to become smaller, while when the content of talc is higher than 3.2 wt %, the initial permeability is liable to lower.

In the present invention, to the above main components, CoO may also be added in an amount of 0.02 to 0.6 wt %, particularly preferably 0.05 to 0.5 wt %, as an additional component. Although CoO is added primarily for increasing the quality coefficient Q, the initial permeability lowers when the amount of CoO becomes too large and exceeds 0.6 wt %.

The NiCuZn-based ferrite material of the present invention relates to a ferrite material having an initial permeability $\mu i$ of not lower than 200. Primarily, it is suitably used in such an application as a tuning coil which requires a high Q value in a band ranging from 0.1 to 2.0 MHz.

The ferrite material of the present invention, for example, is molded into a core material having a predetermined shape, wrapped around by necessary windings and then resin-molded (resin-coated) to be used as a fixed inductor, a chip inductor or the like. These are used, for example, as a variety of electronic equipment in mobile communication devices such as a television, a video recorder, a portable telephone and an automobile telephone. The shape of the core is not particularly limited. An example of the core is a drum-type core having an external diameter of not larger than 2 mm and a length of not larger than 2 mm.

A resin used as a molding material (coating material) may be a thermoplastic or thermosetting resin, for example. Specific examples of the resin include a polyolefin, a polyester, a polyamide, a polycarbonate, a polyurethane, a phenol resin, an urea resin and an epoxy resin. Illustrative examples of means for molding the molding material include dipping, coating, spraying, injection molding and cast molding.

An example of the constitution of a chip inductor using the ferrite material of the present invention will be presented below. For example, the chip inductor comprises a cylindrical core molded from the ferrite material of the present invention and having a large-diameter rig on both sides, a winding wound around the barrel of the core, electrode terminals disposed on both sides of the core for connecting the edges of the wiring to an external electric circuit and fixing the core in a resin, and a resin molded to cover these components.

Next, a description will be given to an example of a method for producing a ferrite by using the ferrite material of the present invention.

Firstly, a mixture is prepared by mixing predetermined amounts of raw materials as the main components with predetermined amounts of raw materials as the additional components such that the proportions of these components in the mixture fall within the ranges specified by the present invention.

Then, the mixture is calcined. The calcination is carried out in an oxidizing atmosphere, for example, in the air. The calcination temperature is preferably 800 to 1,000° C., and the calcination time is preferably 1 to 3 hours. Then, the resulting calcined mixture is milled by a ball mill or the like to predetermined sizes. When the mixture is milled, raw materials as the additional components may be added to and mixed into the mixture. Further, the raw materials as the additional components may be added such that some of the raw materials are added before the calcination and the rest of them are added after the calcination.

After the calcined mixture is milled, an appropriate amount of binder such as a polyvinyl alcohol is added and the resulting product is molded into a desired shape.

Then, the molded compact is sintered. The sintering is carried out in an oxidizing atmosphere, generally in the air. The sintering temperature is about 950 to 1,100° C., and the sintering time is about 2 to 5 hours.

The present invention will be described in more detail with reference to specific examples.

EXPERIMENT EXAMPLE I

As shown in the following Table 1, predetermined amounts of $Fe_2O_3$, $Mn_2O_3$, NiO, CuO and ZnO as main components and predetermined amounts of CoO (added as required), $Bi_2O_3$ and either talc or a combination of $SiO_2$ and MgO were mixed together in a ball mill for 16 hours. The additional components shown in Table 1 are expressed in wt % based on the main components.

Further, these mixed powders were calcined in the air at 900° C. for 2 hours and then mixed and milled in a ball mill for 16 hours. To the obtained ferrite powders, 10 wt % of 6% polyvinyl alcohol solution was added, and the resulting mixtures were granulated and molded under a pressure of 98 MPa into rectangular molded compacts having a size of 50 mm×5 mm×4 mm and toroidal molded compacts having an external diameter of 20 mm, an inner diameter of 10 mm and a height of 5 mm. These molded compacts were sintered in the air at a sintering temperature of 1,080° C. for 2 hours to obtain rectangular core samples and toroidal core samples which were made of ferrites.

Each of these samples was measured for (1) a relative coefficient of temperature dependence ($\alpha\mu ir$), (2) initial permeability ($\mu i$) at 100 kHz, (3) a Q value at 500 kHz and (4) the strength of the sintered body.

The measurements of the above items (1) to (4) were carried out in the following manner.

(1) Relative Coefficient of Temperature Dependence ($\alpha\mu ir$) and (2) Initial Permeability (pi) at 100 kHz After a wire was wound around the toroidal core sample for 20 turns, an inductance value and the like were measured by an LCR meter, and a relative coefficient of temperature dependence ($\alpha\mu ir$) in the range from −20° C. to +60° C. and initial permeability ($\mu i$) at 100 kHz were determined.

The relative coefficient of temperature dependence ($\alpha\mu ir$) is a value indicating a rate of change in initial permeability between two temperatures. For example, when the initial permeability at the temperature $T_1$ is $\mu i_1$ and the initial permeability at the temperature $T_2$ is $\mu i_2$, $\alpha\mu ir$ in the temperature range of $T_1$ to $T_2$ is expressed by the following expression.

$$\alpha\mu ir=(\mu i_2-\mu i_1)/\mu i^{12}(T_2-T_1)$$

(3) O Value at 500 kHz

After a wire was wound around the toroidal core sample for 20 turns, a Q value was measured at a frequency of 500 kHz by an LCR meter.

(4) Strength

Three-point bending strength was measured using the rectangular core sample.

The results are shown in the following Table 1.

TABLE 1

| | Main Components (mol %) | | | | | Additional Components (wt %) | | | | | $\alpha\mu ir$ | Q | Strength |
|---|---|---|---|---|---|---|---|---|---|---|---|---|---|
| Sample No. | $Fe_2O_3$ | $Mn_2O_3$ | NiO | CuO | ZnO | CoO | $Bi_2O_3$ | talc | $SiO_2$ | MgO | $\mu i$ | (ppm) | (500 kHz) | (×10$^7$ Pa) |
| I-1(Comparison) | 46.5 | 0.9 | 15.4 | 6.2 | 31.0 | 0 | 3.6 | 1.8 | — | — | 175 | 7.3 | 92 | 17.5 |
| I-2 | 47.0 | 0.9 | 14.9 | 6.2 | 31.0 | 0 | 3.6 | 1.8 | — | — | 202 | 7.1 | 84 | 17.8 |
| I-3 | 49.2 | 0.9 | 12.7 | 6.2 | 31.0 | 0 | 3.6 | 1.8 | — | — | 236 | 6.3 | 56 | 18.2 |
| I-4(Comparison) | 50.5 | 0.9 | 11.4 | 6.2 | 31.0 | 0 | 3.6 | 1.8 | — | — | 348 | 2.2 | 23 | 19.5 |
| I-5(Comparison) | 49.2 | 0.2 | 13.4 | 6.2 | 31.0 | 0 | 3.6 | 1.8 | — | — | 186 | 6.8 | 62 | 18.5 |
| I-6 | 49.2 | 0.3 | 13.3 | 6.2 | 31.0 | 0 | 3.6 | 1.8 | — | — | 201 | 7.1 | 58 | 18.3 |
| I-7 | 49.2 | 1.5 | 12.1 | 6.2 | 31.0 | 0 | 3.6 | 1.8 | — | — | 284 | 8.5 | 51 | 19.3 |

TABLE 1-continued

| Sample No. | Main Components (mol %) | | | | | Additional Components (wt %) | | | | | $\mu i$ | $\alpha\mu ir$ (ppm) | Q (500 kHz) | Strength ($\times 10^7$ Pa) |
|---|---|---|---|---|---|---|---|---|---|---|---|---|---|---|
| | $Fe_2O_3$ | $Mn_2O_3$ | NiO | CuO | ZnO | CoO | $Bi_2O_3$ | talc | $SiO_2$ | MgO | | | | |
| I-8(Comparison) | 49.2 | 2.0 | 11.6 | 6.2 | 31.0 | 0 | 3.6 | 1.8 | — | — | 317 | 9.0 | 42 | 19.1 |
| I-9(Comparison) | 49.2 | 0.9 | 17.4 | 1.5 | 31.0 | 0 | 3.6 | 1.8 | — | — | 186 | -1.2 | 85 | 19.3 |
| I-10 | 49.2 | 0.9 | 16.9 | 2.0 | 31.0 | 0 | 3.6 | 1.8 | — | — | 201 | -0.5 | 82 | 18.9 |
| I-11 | 49.2 | 0.9 | 10.9 | 8.0 | 31.0 | 0 | 3.6 | 1.8 | — | — | 285 | 5.2 | 52 | 17.4 |
| I-12(Comparison) | 49.2 | 0.9 | 9.9 | 9.0 | 31.0 | 0 | 3.6 | 1.8 | — | — | 304 | 8.7 | 39 | 17.4 |
| I-13(Comparison) | 49.2 | 0.9 | 13.7 | 6.2 | 30.0 | 0 | 3.6 | 1.8 | — | — | 198 | 7.4 | 58 | 18.2 |
| I-14(Comparison) | 49.2 | 0.9 | 10.2 | 6.2 | 33.5 | 0 | 3.6 | 1.8 | — | — | 241 | -9.8 | 47 | 17.8 |
| I-15 | 49.2 | 0.9 | 12.7 | 6.2 | 31.0 | 0.3 | 3.6 | 1.8 | — | — | 205 | 8.9 | 58 | 18.4 |
| I-16 | 49.2 | 0.9 | 12.7 | 6.2 | 31.0 | 0.5 | 3.6 | 1.8 | — | — | 201 | 9.8 | 61 | 18.2 |
| I-17(Comparison) | 49.2 | 0.9 | 12.7 | 6.2 | 31.0 | 0.65 | 3.6 | 1.8 | — | — | 196 | 11.5 | 63 | 18.7 |
| I-18(Comparison) | 49.2 | 0.9 | 12.7 | 6.2 | 31.0 | 0 | 0.4 | 1.8 | — | — | 164 | 10.1 | 32 | 12.4 |
| I-19(Comparison) | 49.2 | 0.9 | 12.7 | 6.2 | 31.0 | 0 | 6.5 | 1.8 | — | — | 261 | -0.2 | 48 | 17.5 |
| I-20(Comparison) | 49.2 | 0.9 | 12.7 | 6.2 | 31.0 | 0 | 3.6 | 0.1 | — | — | 306 | 12.5 | 38 | 15.8 |
| I-21 | 49.2 | 0.9 | 12.7 | 6.2 | 31.0 | 0 | 3.6 | 0.15 | — | — | 276 | 10.0 | 51 | 17.5 |
| I-22(Comparison) | 49.2 | 0.9 | 12.7 | 6.2 | 31.0 | 0 | 3.6 | 3.5 | — | — | 195 | 8.0 | 72 | 20.1 |
| I-23(Comparison) | 49.2 | 0.9 | 12.7 | 6.2 | 31.0 | 0 | 3.6 | — | 0.05 | 0.60 | 351 | 7.9 | 44 | 16.2 |
| I-24 | 49.2 | 0.9 | 12.7 | 6.2 | 31.0 | 0 | 3.6 | — | 0.1 | 0.60 | 360 | 8.1 | 51 | 17.4 |
| I-25 | 49.2 | 0.9 | 12.7 | 6.2 | 31.0 | 0 | 3.6 | — | 2.0 | 0.60 | 203 | 9.9 | 50 | 18.9 |
| I-26(Comparison) | 49.2 | 0.9 | 12.7 | 6.2 | 31.0 | 0 | 3.6 | — | 2.3 | 0.60 | 193 | 10.2 | 47 | 18.4 |
| I-27(Comparison) | 49.2 | 0.9 | 12.7 | 6.2 | 31.0 | 0 | 3.6 | — | 1.2 | 0.03 | 300 | 8.0 | 45 | 18.6 |
| I-28 | 49.2 | 0.9 | 12.7 | 6.2 | 31.0 | 0 | 3.6 | — | 1.2 | 0.05 | 311 | 4.3 | 50 | 18.4 |
| I-29 | 49.2 | 0.9 | 12.7 | 6.2 | 31.0 | 0 | 3.6 | — | 1.2 | 0.5 | 206 | 4.7 | 68 | 17.6 |
| I-30(Comparison) | 49.2 | 0.9 | 12.7 | 6.2 | 31.0 | 0 | 3.6 | — | 1.2 | 1.10 | 184 | 4.6 | 104 | 17.4 |

The sample No. I-14 has a low Curie point of 118° C. and is treated as a comparative example sample. Other samples have a Curie point of not lower than 120° C.

The effect of the present invention is obvious from the above result. That is, the present invention is an NiCuZn-based ferrite material containing, as main components, an iron oxide in an amount of 47.0 to 50.0 mol % in terms of $Fe_2O_3$, a manganese oxide in an amount of 0.3 to 1.5 mol % in terms of $Mn_2O_3$, a copper oxide in an amount of 2.0 to 8.0 mol % in terms of CuO, zinc oxide in an amount of 30.1 to 33.0 mol % in terms of ZnO and a nickel oxide (NiO) in mol % as the balance, wherein 0.5 to 6.0 wt % of bismuth oxide in terms of $Bi_2O_3$, 0.1 to 2.0 wt % of silicon oxide in terms of $SiO_2$ and 0.05 to 1.0 wt % of magnesium oxide in terms of MgO are further contained in addition to the main components. Thus, an NiCuZn-based ferrite material having extremely good temperature dependence of initial permeability (rate of change in permeability along with a change in temperature is small), a high quality coefficient Q and high strength can be obtained.

(2) Description of the Invention of the Second Invention Group

A detailed description will be given to the ferrite material of the present invention hereinafter. The ferrite material of the present invention is an NiCuZn-based ferrite material which contains, as its substantial main components, an iron oxide in an amount of 47.0 to 50.0 mol % (particularly preferably 47.5 to 49.5 mol %) in terms of $Fe_2O_3$, a manganese oxide in an amount of 0.01 to 3.0 mol % (particularly preferably 0.1 to 2.5 mol %) in terms of $Mn_2O_3$, a copper oxide in an amount of 0.5 to 4.9 mol % (particularly preferably 1.0 to 4.9 mol %) in terms of CuO, zinc oxide in an amount of 1.0 to 23.0 mol % (particularly preferably 1.0 to 22.0 mol %) in terms of ZnO and a nickel oxide in mol % in terms of NiO as the balance.

Further, the ferrite material of the present invention also contains a cobalt oxide in an amount of 0.02 to 1.0 wt % (particularly preferably 0.1 to 0.9 wt %) in terms of CoO, a bismuth oxide in an amount of 0.5 to 10.0 wt % (particularly preferably 0.7 to 8.0 wt %) in terms of $Bi_2O_3$, a silicon oxide in an amount of 0.1 to 2.0 wt % (particularly preferably 0.12 to 2.0 wt %) in terms of $SiO_2$ and a magnesium oxide in an amount of 0.05 to 1.0 wt % (particularly preferably 0.05 to 0.9 wt %) in terms of MgO, in addition to the above main components.

Talc contains Si and Mg in predetermined proportions as sintering components. Therefore, talc can be added in place of the above $SiO_2$ and MgO. In that case, to satisfy the above amounts of $SiO_2$ and MgO, talc is added in an amount of 0.15 to 3.2 wt %.

In the above composition, when the content of $Fe_2O_3$ is lower than 47 mol %, the inconvenience that a change in permeability along with a change in temperature becomes larger occurs, while when the content of $Fe_2O_3$ is higher than 50.0 mol %, the inconvenience that a quality coefficient Q becomes smaller occurs. When the above predetermine amount of $Mn_2O_3$ is contained, the value of the quality coefficient Q can be increased. However, when the amount of $Mn_2O_3$ becomes too large and exceeds the above 3.0 mol %, the inconvenience that the value of the quality coefficient Q is decreased occurs.

When the content of CuO is higher than 4.9 mol %, the growth of abnormal grains is liable to occur and the value of the quality coefficient Q is decreased, while when the content of CuO is lower than 0.5 mol %, the inconvenience that a change in permeability along with a change in temperature becomes larger occurs.

When the content of ZnO is higher than 23.0 mol % or lower than 1.0 mol %, the inconvenience that the value of the quality coefficient Q is decreased is liable to occur.

CoO is added primarily for increasing the quality coefficient Q and controlling the temperature dependence of initial permeability. However, when the amount of CoO becomes too large and exceeds 1.0 wt %, a change in permeability along with a change in temperature is liable to become larger suddenly. On the other hand, when the amount of CoO becomes too small and smaller than 0.02 wt %, the effect of decreasing a change in permeability along with a change in temperature can be hardly seen.

When the content of $Bi_2O_3$ is lower than 0.5 wt %, a sintered density becomes lower, so that the inconvenience that the strength of a sintered body lowers occurs. On the other hand, when the content of $Bi_2O_3$ is higher than 10.0 wt %, the inconvenience that a change in permeability along with a change in temperature is liable to become larger.

When the content of $SiO_2$ is lower than 0.1 wt %, a change in permeability along with a change in temperature is liable to become larger, while when the content of $SiO_2$ is higher than 2.0 wt %, the quality coefficient Q is liable to become smaller.

When the content of MgO is lower than 0.05 wt %, the quality coefficient Q is liable to become smaller and a change in permeability along with a change in temperature is liable to become larger, while when the content of MgO is higher than 1.0 wt %, a change in permeability along with a change in temperature is liable to become larger.

As for talc correlated with the contents of the above $SiO_2$ and MgO, when the content of talc is lower than 0.15 wt %, a change in permeability along with a change in temperature is liable to become larger. On the other hand, when the content of talc is higher than 3.2 wt %, the quality coefficient Q is liable to become smaller and a change in permeability along with a change in temperature is liable to become larger.

The NiCuZn-based ferrite material of the present invention relates to a ferrite material having an initial permeability $\mu i$ of not higher than 100. Primarily, it is suitably used in such an application as a tuning coil which requires a high Q value in a band ranging from 0.5 to 250 MHz.

The ferrite material of the present invention, for example, is molded into a core material having a predetermined shape, wrapped around by necessary windings and then resin-molded (resin-coated) to be used as a fixed inductor, a chip inductor or the like. These are used, for example, as a variety of electronic equipment in mobile communication devices such as a television, a video recorder, a portable telephone and an automobile telephone. The shape of the core is not particularly limited. An example of the core is a drum-type core having an external diameter of not larger than 2 mm and a length of not larger than 2 mm.

A resin used as a molding material (coating material) may be a thermoplastic or thermosetting resin, for example. Specific examples of the resin include a polyolefin, a polyester, a polyamide, a polycarbonate, a polyurethane, a phenol resin, an urea resin and an epoxy resin. Illustrative examples of means for molding the molding material include dipping, coating, spraying, injection molding and cast molding.

An example of the constitution of a chip inductor using the ferrite material of the present invention will be presented below. For example, the chip inductor comprises a cylindrical core molded from the ferrite material of the present invention and having a large-diameter rig on both sides, a winding wound around the barrel of the core, electrode terminals disposed on both sides of the core for connecting the edges of the wiring to an external electric circuit and fixing the core in a resin, and a resin molded to cover these components.

Next, a description will be given to an example of a method for producing a ferrite by using the ferrite material of the present invention.

Firstly, a mixture is prepared by mixing predetermined amounts of raw materials as the main components with predetermined amounts of raw materials as the additional components such that the proportions of these components in the mixture fall within the ranges specified by the present invention.

Then, the mixture is calcined. The calcination is carried out in an oxidizing atmosphere, for example, in the air. The calcination temperature is preferably 800 to 1,000° C., and the calcination time is preferably 1 to 3 hours. Then, the resulting calcined mixture is milled by a ball mill or the like to predetermined sizes. When the mixture is milled, raw materials as the additional components may be added to and mixed into the mixture. Further, the raw materials as the additional components may be added such that some of the raw materials are added before the calcination and the rest of them are added after the calcination.

After the calcined mixture is milled, an appropriate amount of binder such as a polyvinyl alcohol is added and the resulting product is molded into a desired shape.

Then, the molded compact is sintered. The sintering is carried out in an oxidizing atmosphere, generally in the air. The sintering temperature is about 950 to 1,100° C., and the sintering time is about 2 to 5 hours.

The present invention will be described in more detail with reference to specific examples.

EXPERIMENT EXAMPLE II

As shown in the following Table 2, predetermined amounts of $Fe_2O_3$, $Mn_2O_3$, NiO, CuO and ZnO as main components and predetermined amounts of CoO, $Bi_2O_3$ and either talc or a combination of $SiO_2$ and MgO were mixed together in a ball mill for 16 hours. The additional components shown in Table 2 are expressed in wt % based on the main components.

Further, these mixed powders were calcined in the air at 900° C. for 2 hours and then mixed and milled in a ball mill for 16 hours. To the obtained ferrite powders, 10 wt % of 6% polyvinyl alcohol solution was added, and the resulting mixtures were granulated and molded under a pressure of 98 MPa into rectangular molded compacts having a size of 50 mm×5 mm×4 mm and toroidal molded compacts having an external diameter of 20 mm, an inner diameter of 10 mm and a height of 5 mm. These molded compacts were sintered in the air at a sintering temperature of 1,030° C. for 2 hours to obtain rectangular core samples and toroidal core samples which were made of ferrites.

Each of these samples was measured for (1) a relative coefficient of temperature dependence ($\alpha\mu ir$), (2) initial permeability ($\mu i$) at 100 kHz, (3) a Q value at 2 MHz and (4) the strength of the sintered body.

The measurements of the above items (1) to (4) were carried out in the following manner.

(1) Relative Coefficient of Temperature Dependence ($\alpha\mu ir$) and (2) Initial Permeability ($\mu i$) at 100 kHz After a wire was wound around the toroidal core sample for 20 turns, an inductance value and the like were measured by an LCR meter, and a relative coefficient of temperature dependence ($\alpha\mu ir$) in the range from −20° C. to +60° C. and initial permeability ($\mu i$) at 100 kHz were determined.

The relative coefficient of temperature dependence ($\alpha\mu ir$) is a value indicating a rate of change in initial permeability between two temperatures. For example, when the initial permeability at the temperature $T_1$ is $\mu i_1$ and the initial permeability at the temperature $T_2$ is $\mu i_2$, $\alpha\mu ir$ in the temperature range of $T_1$ to $T_2$ is expressed by the following expression.

$$\alpha\mu ir = (\mu i_2 - \mu i_1)/\mu i_1^2 (T_2 - T_1)$$

(3) Q Value at 2 MHz

After a wire was wound around the toroidal core sample for 20 turns, a Q value was measured at a frequency of 2 MHz by an LCR meter.

(4) Strength

Three-point bending strength was measured using the rectangular core sample.

The results are shown in the following Table 2.

TABLE 2

| Sample No. | Main Components (mol %) | | | | | Additional Components (wt %) | | | | | $\mu i$ | $\alpha\mu i$ (ppm) | Q (2 kHz) | Strength ($\times 10^7$ Pa) |
|---|---|---|---|---|---|---|---|---|---|---|---|---|---|---|
| | $Fe_2O_3$ | $Mn_2O_3$ | NiO | CuO | ZnO | CoO | $Bi_2O_3$ | talc | $SiO_2$ | MgO | | | | |
| II-1(Comparison) | 46.5 | 0.5 | 29.0 | 3.2 | 20.8 | 0.30 | 5.2 | 2.5 | — | — | 32.7 | 26.2 | 209 | 16.8 |
| II-2 | 47.0 | 0.5 | 29.0 | 3.2 | 20.3 | 0.30 | 5.2 | 2.5 | — | — | 33.5 | 19.7 | 198 | 17.4 |
| II-3 | 49.3 | 0.5 | 29.0 | 3.2 | 18.0 | 0.30 | 5.2 | 2.5 | — | — | 36.9 | 9.1 | 179 | 15.6 |
| II-4(Comparison) | 50.5 | 0.5 | 29.0 | 3.2 | 16.8 | 0.30 | 5.2 | 2.5 | — | — | 54.4 | 3.0 | 97 | 18.2 |
| II-5(Comparison) | 49.5 | 0 | 29.3 | 3.2 | 18.0 | 0.30 | 5.2 | 2.5 | — | — | 36.2 | 9.3 | 99 | 15.6 |
| II-6 | 47.5 | 2.0 | 29.3 | 3.2 | 18.0 | 0.30 | 5.2 | 2.5 | — | — | 53.2 | 15.4 | 155 | 18.6 |
| II-7(Comparison) | 47.5 | 3.2 | 28.8 | 3.2 | 17.3 | 0.30 | 5.2 | 2.5 | — | — | 55.0 | 14.0 | 98 | 18.4 |
| II-8(Comparison) | 49.3 | 0.5 | 33.2 | 0.1 | 16.9 | 0.30 | 5.2 | 2.5 | — | — | 26.6 | 21.0 | 268 | 14.5 |
| II-9 | 49.3 | 0.5 | 32.7 | 0.5 | 17.0 | 0.30 | 5.2 | 2.5 | — | — | 26.7 | 18.7 | 282 | 15.1 |
| II-10 | 49.3 | 0.5 | 29.0 | 4.8 | 16.4 | 0.30 | 5.2 | 2.5 | — | — | 38.6 | 13.6 | 105 | 15.8 |
| II-11 (Comparison) | 49.3 | 0.52 | 9.0 | 5.0 | 16.2 | 0.30 | 5.2 | 2.5 | — | — | 39.9 | 19.7 | 94 | 15.2 |
| II-12 (Comparison) | 49.3 | 0.54 | 7.0 | 3.0 | 0.2 | 0.30 | 5.2 | 2.5 | — | — | 8.7 | −14.3 | 87 | 16.3 |
| II-13 | 49.3 | 0.5 | 46.0 | 3.2 | 1.0 | 0.30 | 5.2 | 2.5 | — | — | 10.1 | −9.6 | 104 | 16.0 |
| II-14 (Comparison) | 49.3 | 0.52 | 3.5 | 3.2 | 23.5 | 0.30 | 5.2 | 2.5 | — | — | 49.4 | 14.4 | 88 | 16.2 |
| II-15 (Comparison) | 49.3 | 0.52 | 9.0 | 3.2 | 18.0 | 0 | 5.2 | 2.5 | — | — | 41.1 | −0.7 | 105 | 15.4 |
| II-16 | 49.3 | 0.5 | 29.0 | 3.2 | 18.0 | 0.02 | 5.2 | 2.5 | — | — | 40.5 | 0.5 | 111 | 15.6 |
| II-17 | 49.3 | 0.5 | 29.0 | 3.2 | 18.0 | 1.00 | 5.2 | 2.5 | — | — | 34.2 | 18.6 | 211 | 15.8 |
| II-18 (Comparison) | 49.3 | 0.52 | 9.0 | 3.2 | 18.0 | 1.20 | 5.2 | 2.5 | — | — | 33.1 | 25.9 | 227 | 16.2 |
| II-19 (Comparison) | 49.3 | 0.52 | 9.0 | 3.2 | 18.0 | 0.30 | 0.2 | 2.5 | — | — | 22.4 | 19.9 | 199 | 8.4 |
| II-20 | 49.3 | 0.5 | 29.0 | 3.2 | 18.0 | 0.30 | 0.5 | 2.5 | — | — | 22.1 | 19.7 | 199 | 12.1 |
| II-21 | 49.3 | 0.5 | 29.0 | 3.2 | 18.0 | 0.30 | 10.0 | 2.5 | — | — | 34.2 | 19.9 | 183 | 15.0 |
| II-22 (Comparison) | 49.3 | 0.5 | 29.0 | 3.2 | 18.0 | 0.30 | 12.0 | 2.5 | — | — | 31.3 | 24.6 | 175 | 15.9 |
| II-23 (Comparison) | 49.3 | 0.5 | 29.0 | 3.2 | 18.0 | 0.30 | 5.2 | 0 | — | — | 79.9 | 23.5 | 190 | 15.1 |
| II-24 | 49.3 | 0.5 | 29.0 | 3.2 | 18.0 | 0.30 | 5.2 | 0.15 | — | — | 75.4 | 19.8 | 174 | 15.4 |
| II-25 | 49.3 | 0.5 | 29.0 | 3.2 | 18.0 | 0.30 | 5.2 | 2.6 | — | — | 34.8 | 8.6 | 178 | 16.2 |
| II-26 (Comparison) | 49.3 | 0.5 | 29.0 | 3.2 | 18.0 | 0.30 | 5.2 | 3.5 | — | — | 32.5 | 20.6 | 89 | 17.5 |
| II-27 (Comparison) | 49.3 | 0.5 | 29.0 | 3.2 | 18.0 | 0.30 | 5.2 | — | 0 | 0.80 | 47.8 | 22.2 | 155 | 13.2 |
| II-28 | 49.3 | 0.5 | 29.0 | 3.2 | 18.0 | 0.30 | 5.2 | — | 0.1 | 0.80 | 48.3 | 19.3 | 156 | 14.5 |
| II-29 | 49.3 | 0.5 | 29.0 | 3.2 | 18.0 | 0.30 | 5.2 | — | 1.7 | 0.80 | 39.7 | 10.3 | 129 | 15.6 |
| II-30 (Comparison) | 49.3 | 0.52 | 9.0 | 3.2 | 18.0 | 0.30 | 5.2 | — | 2.1 | 0.80 | 38.1 | 10.1 | 85 | 17.0 |
| II-31 (Comparison) | 49.3 | 0.5 | 29.0 | 3.2 | 18.0 | 0.30 | 5.2 | — | 1.7 | 0 | 58.3 | 32.1 | 81 | 15.8 |
| II-32 | 49.3 | 0.5 | 29.0 | 3.2 | 18.0 | 0.30 | 5.2 | — | 1.7 | 0.05 | 50.8 | 18.2 | 105 | 14.9 |
| II-33 | 49.3 | 0.5 | 29.0 | 3.2 | 18.0 | 0.30 | 5.2 | — | 1.7 | 0.90 | 41.5 | 15.9 | 146 | 16.7 |
| II-34 (Comparison) | 49.3 | 0.5 | 29.0 | 3.2 | 18.0 | 0.30 | 5.2 | — | 1.7 | 1.10 | 42.4 | 20.4 | 289 | 15.5 |
| II-35 (Comparison) | 47.5 | — | 35.0 | 8.0 | 9.5 | 0.20 | 5.0 | — | 2.0 | — | 34.0 | 33.4 | 71 | 19.3 |
| II-36 | 49.3 | 0.02 | 29.0 | 3.2 | 18.48 | 0.2 | 3.0 | 2.5 | — | — | 37.0 | 9.5 | 102 | 15.8 |

The effect of the present invention is obvious from the above result. That is, the present invention is an NiCuZn-based ferrite material containing, as main components, an iron oxide in an amount of 47.0 to 50.0 mol % in terms of $Fe_2O_3$, a manganese oxide in an amount of 0.01 to 3.0 mol % in terms of $Mn_2O_3$, a copper oxide in an amount of 0.5 to 4.9 mol % in terms of CuO, zinc oxide in an amount of 1.0 to 23.0 mol % in terms of ZnO and a nickel oxide (NiO) in mol % as the balance, wherein 0.02 to 1.0 wt % of cobalt oxide in terms of CoO, 0.5 to 10.0 wt % of bismuth oxide in terms of $Bi_2O_3$, 0.1 to 2.0 wt % of silicon oxide in terms of $SiO_2$ and 0.05 to 1.0 wt % of magnesium oxide in terms of MgO are further contained in addition to the main components. Alternatively, the present invention is an NiCuZn-based ferrite material containing, as main components, an iron oxide in an amount of 47.0 to 50.0 mol % in terms of $Fe_2O_3$, a manganese oxide in an amount of 0.01 to 3.0 mol % in terms of $Mn_2O_3$, a copper oxide in an amount of 0.5 to 4.9 mol % in terms of CuO, zinc oxide in an amount of 1.0 to 23.0 mol % in terms of ZnO and a nickel oxide (NiO) in mol % as the balance, wherein 0.02 to 1.0 wt % of cobalt oxide in terms of CoO, 0.5 to 10.0 wt % of bismuth oxide in terms of $Bi_2O_3$ and 0.15 to 3.2 wt % of talc are further contained in addition to the main components. Thus, an NiCuZn-based ferrite material having extremely good temperature dependence of initial permeability (rate of change in permeability along with a change in temperature is small), a high quality coefficient Q and high strength can be obtained.

(3) Description of the Invention of the Third Invention Group

A description will be given to an embodiment of the present invention hereinafter.

In the present invention, as a result of studying the contents of an iron oxide, a copper oxide, zinc oxide and a nickel oxide which are the main components of an NiCuZn-based ferrite material and the contents of a cobalt oxide, a bismuth oxide and either a combination of a silicon oxide and magnesium oxide or talc which are the additional components of the NiCuZn-based ferrite material, a ferrite material having high initial permeability μi, excellent stress resistance, a small inductance change caused by a compressive stress and a gentle change in permeability along with a change in temperature can be obtained when the above contents are in predetermined ranges.

That is, the ferrite material of the present invention contains an iron oxide in an amount of 46.0 to 49.0 mol %, preferably 46.5 to 49.0 mol %, in terms of $Fe_2O_3$, a copper oxide in an amount of 4.0 to 11.0 mol %, preferably 5.0 to 9.0 mol %, in terms of CuO, zinc oxide in an amount of 30.1 to 33.0 mol %, preferably 30.1 to 32.0 mol %, in terms of ZnO, and a nickel oxide (preferably in an amount of 7.0 to 20.0 mol % in terms of NiO) as the balance. Further, the ferrite material of the present invention contains, as additional components, a cobalt oxide in an amount of 0.005 to 0.03 wt %, preferably 0.005 to 0.025 wt %, in terms of CoO, a bismuth oxide in an amount of 0.1 to 0.5 wt %, preferably 0.1 to 0.45 wt %, in terms of $Bi_2O_3$, a silicon oxide in an amount of 0.1 to 0.6 wt %, preferably 0.1 to 0.5 wt %, in terms of $SiO_2$, and magnesium oxide in an amount of 0.05 to 1.0 wt %, preferably 0.05 to 0.8 wt %, in terms of MgO, based on the above main components. Further, talc may be added in place of the silicon oxide and magnesium oxide as additional components. Talc is added in an amount of 0.1 to 2.0 wt %, preferably 0.15 to 1.8 wt %, based on the main components.

The ferrite material of the present invention has an initial permeability μi of not lower than 200 at a frequency of 100 kHz.

Further, the ferrite material of the present invention has a small relative coefficient of temperature dependence αμir in absolute value of initial permeability. This relative coefficient of temperature dependence αμir is a value indicating a rate of change in initial permeability between two temperatures. For example, when the initial permeability at the temperature $T_1$ is $\mu i_1$ and the initial permeability at the temperature $T_2$ is $\mu i_2$, αμir in the temperature range of $T_1$ to $T_2$ is expressed by the following expression. The initial permeability $\mu i_1$ is measured at a frequency of 100 kHz.

$$\alpha \mu ir = [(\mu i_2 - \mu i_1)/\mu i_1^2] \times [1/(T_2 - T_1)]$$

The ferrite material of the present invention has a relative coefficient of temperature dependence αμir of initial permeability at 20 to 60° C. of ±5 (ppm/° C.). When the relative coefficient of temperature dependence αμir is such a small value, the initial permeability is not susceptible to temperature, so that when the ferrite material is used in an inductor element, its reliability is improved.

Further, the ferrite material of the present invention exhibits a small inductance change caused by a compressive stress and has good stress resistance. For example, the ferrite material of the present invention exhibits an inductance change rate ΔL/L×100 in a range of ±5% when monoaxially pressurized at a pressure of 98 MPa. L is an inductance before the material is pressurized, and ΔL is a rate of change in inductance caused by the pressurization. Since the ferrite material of the present invention has good stress resistance as described above, a change in inductance caused by molding of a resin can be reduced and high-precision electrical machinery and apparatus can be produced.

When the content of the iron oxide which is a main component of the present invention is lower than 46.0 mol %, the initial permeability μi decreases, while when the content is higher than 49.0 mol %, the value of the quality coefficient Q decreases disadvantageously. Further, the required content of the cobalt oxide increases to increase the Q value, which is not desirable from the viewpoint of production costs. Further, when the content of the copper oxide is lower than 4.0 mol %, a change in permeability along with a change in temperature becomes large, while when the content of the copper oxide is higher than 11.0 mol %, the Q value decreases disadvantageously. Further, when the content of zinc oxide is lower than 30.1 mol %, the stress resistance deteriorates, while when the content of zinc oxide is higher than 33.0 mol %, the Curie point becomes lower than 120° C., which is problematic in practical use.

In addition, when the content of the cobalt oxide which is an additional component is lower than 0.005 wt % based on the main components, the Q value decreases, while when the content of the cobalt oxide is higher than 0.03 wt %, the stress resistance deteriorates disadvantageously. When the content of the bismuth oxide which is an additional component is lower than 0.1 wt % based on the main components, the stress resistance deteriorates, while when the content of the bismuth oxide is higher than 0.5 wt %, a change in permeability along with a change in temperature becomes large disadvantageously. Further, when the content of the silicon oxide which is an additional component is lower than 0.1 wt % based on the main components, the stress resistance deteriorates, while when the content of the silicon oxide is higher than 0.6 wt %, the Q value decreases disadvantageously. Further, when the content of magnesium oxide which is an additional component is lower than 0.05 wt % based on the main components, the stress resistance deteriorates, while when the content of magnesium oxide is higher than 1.0 wt %, a change in permeability along with a change in temperature becomes large disadvantageously. Further, when the content of talc which is used in place of the silicon oxide and magnesium oxide as additional components is lower than 0.1 wt % based on the main components, the stress resistance deteriorates, while the content of talc is higher than 2.0 wt %, the initial permeability μi decreases disadvantageously.

The above ferrite material of the present invention can be produced by calcining raw materials containing the iron oxide, copper oxide, zinc oxide, nickel oxide, cobalt oxide, bismuth oxide, silicon oxide and magnesium oxide or talc in such amounts that the proportions of these components in the composition of the ferrite material after calcination would be in the above ranges, molding the calcined powders into a desired form and sintering the molded compact (at 1,000 to 1,100° C., for example).

Next, a detailed description will be given to the present invention with reference to specific examples.

EXAMPLE III

Preparation of Ferrite Material

Firstly, $Fe_2O_3$, CuO, ZnO and NiO as main components were weighed so that their weight ratios (mol %) should be those shown in the following Table 3, and based on the composition of these main components, $Bi_2O_3$, CoO, $SiO_2$, MgO and talc were weighed so that their weight ratios (wt %) should be those shown in Table 3. Then, these materials were wet-blended in a steel ball mill for 16 hours. Thereafter, the obtained mixed powders were calcined at 900° C. for 2 hours and then mixed and milled in a ball mill for 16 hours.

Then, to the obtained milled powders, 10 wt % of 6% polyvinyl alcohol aqueous solution was added, and the resulting mixtures were granulated. The thus-obtained granules were press-molded under a pressure of 98 MPa into rectangular samples (width: 7 mm, thickness: 7 mm, length: 35 mm) and toroidal samples (external diameter: 20 mm, inner diameter: 10 mm, height: 5 mm). These molded compacts were sintered in the air at 1,000 to 1,100° C. for 2 hours to obtain ferrite materials (samples 1 to 35). When the final compositions of the ferrite materials were measured by fluorescent X-ray spectroscopy, they corresponded to the initial compositions.

Evaluations of Ferrite Materials

Each of the above ferrite materials (samples 1 to 35) was measured for an initial permeability $\mu i$, a relative coefficient of temperature dependence $\alpha\mu ir$ of initial permeability, stress resistance, a Q value as a quality coefficient and a Curie point Tc. The results are shown in the following Table 3.

[Measurements of Initial Permeability and Relative Coefficient of Temperature Dependence of Initial Permeability]

After a wire was wound around the obtained toroidal ferrite material for 20 turns, an initial permeability $\mu i$ at 100 kHz was measured by an LCR meter (HP4192, product of Hewlett-Packard Company), and a relative coefficient of temperature dependence $\alpha\mu ir$ at temperatures ranging from 20° C. to 60° C. was calculated from the following expression.

$$\alpha\mu ir = [(\mu i_2 - \mu i_1)/\mu i_1{}^2] \times [1/(T_2 - T_1)]$$

($\mu i_1$=initial permeability at temperature $T_1$)
($\mu i_2$=initial permeability at temperature $T_2$)

[Measurement of Stress Resistance]

After a wire was wound around the barrel of the obtained rectangular sample for 20 turns, a monoaxial compressive force is applied to the resulting sample at a fixed speed. The inductance value of the sample under the application of the monoaxial compressive force was measured continuously by an LCR meter (HP4285A, product of Hewlett-Packard Company), and an inductance change rate was calculated from the obtained measurements. The inductance change rate ($\Delta L/L \times 100$) of each sample under the application of a monoaxial compressive force of 1 t/cm$^2$ is shown in Table 3.

[Measurement of Quality Coefficient Q Value]

After a wire was wound around the obtained toroidal ferrite material for 20 turns, a Q value at 100 kHz was measured by an LCR meter (HP4192A, product of Hewlett-Packard Company).

TABLE 3

| Samples | Composition of Main Components (mol %) | | | | Composition of Additional Components (wt %) | | | | | $\mu i$ | $\alpha\mu ir$ (ppm) | Stress Resistance (%) | Q value | Tc (° C.) |
|---|---|---|---|---|---|---|---|---|---|---|---|---|---|---|
| | Fe$_2$O$_3$ | NiO | CuO | ZnO | CoO | Bi$_2$O$_3$ | talc | SiO$_2$ | MgO | | | | | |
| Sample 1 | 46.5 | 15.5 | 8.0 | 31.0 | 0.010 | 0.20 | 0.35 | 0.00 | 0.00 | 141 | −0.8 | 1.8 | 118 | ≧120 |
| Sample 2 | 46.0 | 15.0 | 8.0 | 31.0 | 0.010 | 0.20 | 0.35 | 0.00 | 0.00 | 203 | −2.3 | −0.9 | 134 | ≧120 |
| Sample 3 | 48.0 | 13.0 | 8.0 | 31.0 | 0.010 | 0.20 | 0.35 | 0.00 | 0.00 | 712 | 1.9 | −3.8 | 135 | ≧120 |
| Sample 4 | 49.0 | 12.0 | 8.0 | 31.0 | 0.010 | 0.20 | 0.35 | 0.00 | 0.00 | 532 | 4.7 | −4.7 | 102 | ≧120 |
| Sample 5 | 49.1 | 11.9 | 8.0 | 31.0 | 0.010 | 0.20 | 0.35 | 0.00 | 0.00 | 524 | 5.6 | −5.1 | 97 | ≧120 |
| Sample 6 | 48.0 | 17.3 | 3.7 | 31.0 | 0.010 | 0.20 | 0.35 | 0.00 | 0.00 | 586 | 5.6 | −4.1 | 153 | ≧120 |
| Sample 7 | 48.0 | 17.0 | 4.0 | 31.0 | 0.010 | 0.20 | 0.35 | 0.00 | 0.00 | 613 | 4.9 | −3.2 | 147 | ≧120 |
| Sample 8 | 48.0 | 10.0 | 11.0 | 31.0 | 0.010 | 0.20 | 0.35 | 0.00 | 0.00 | 663 | 3.2 | −3.8 | 101 | ≧120 |
| Sample 9 | 48.0 | 9.0 | 12.0 | 31.0 | 0.010 | 0.20 | 0.35 | 0.00 | 0.00 | 617 | 3.5 | −4.1 | 88 | ≧120 |
| Sample 10 | 48.0 | 14.0 | 8.0 | 30.0 | 0.010 | 0.20 | 0.35 | 0.00 | 0.00 | 647 | 4.1 | −5.1 | 164 | ≧120 |
| Sample 11 | 48.0 | 11.0 | 8.0 | 33.0 | 0.010 | 0.20 | 0.35 | 0.00 | 0.00 | 590 | −2.0 | −1.9 | 105 | ≧120 |
| Sample 12 | 48.0 | 10.0 | 8.0 | 34.0 | 0.010 | 0.20 | 0.35 | 0.00 | 0.00 | 507 | −13.5 | −1.5 | 79 | 108 |
| Sample 13 | 48.0 | 13.0 | 8.0 | 31.0 | 0.000 | 0.20 | 0.35 | 0.00 | 0.00 | 703 | 0.8 | −2.3 | 95 | ≧120 |
| Sample 14 | 48.0 | 13.0 | 8.0 | 31.0 | 0.005 | 0.20 | 0.35 | 0.00 | 0.00 | 698 | 1.2 | −2.5 | 106 | ≧120 |
| Sample 15 | 48.0 | 13.0 | 8.0 | 31.0 | 0.030 | 0.20 | 0.35 | 0.00 | 0.00 | 108 | 2.2 | −4.9 | 152 | ≧120 |
| Sample 16 | 48.0 | 13.0 | 8.0 | 31.0 | 0.040 | 0.20 | 0.35 | 0.00 | 0.00 | 690 | 2.9 | −5.3 | 165 | ≧120 |
| Sample 17 | 48.0 | 13.0 | 8.0 | 31.0 | 0.010 | 0.05 | 0.35 | 0.00 | 0.00 | 754 | 3.2 | −5.1 | 158 | ≧120 |
| Sample 18 | 48.0 | 13.0 | 8.0 | 31.0 | 0.010 | 0.10 | 0.35 | 0.00 | 0.00 | 731 | 2.0 | −4.3 | 143 | ≧120 |
| Sample 19 | 48.0 | 13.0 | 8.0 | 31.0 | 0.010 | 0.50 | 0.35 | 0.00 | 0.00 | 515 | −4.2 | −2.2 | 149 | ≧120 |
| Sample 20 | 48.0 | 13.0 | 8.0 | 31.0 | 0.010 | 0.60 | 0.35 | 0.00 | 0.00 | 398 | −5.1 | −2.0 | 164 | ≧120 |
| Sample 21 | 48.0 | 13.0 | 8.0 | 31.0 | 0.010 | 0.20 | 0.05 | 0.00 | 0.00 | 970 | 4.2 | −5.2 | 112 | ≧120 |
| Sample 22 | 48.0 | 13.0 | 8.0 | 31.0 | 0.010 | 0.20 | 0.10 | 0.00 | 0.00 | 965 | 3.5 | −4.9 | 121 | ≧120 |
| Sample 23 | 48.0 | 13.0 | 8.0 | 31.0 | 0.010 | 0.20 | 0.50 | 0.00 | 0.00 | 579 | 1.1 | −2.5 | 144 | ≧120 |
| Sample 24 | 48.0 | 13.0 | 8.0 | 31.0 | 0.010 | 0.20 | 2.00 | 0.00 | 0.00 | 193 | 4.9 | −1.6 | 161 | 108 |
| Sample 25 | 48.0 | 13.0 | 8.0 | 31.0 | 0.010 | 0.20 | 2.20 | 0.00 | 0.00 | 196 | −0.1 | −0.3 | 130 | ≧120 |
| Sample 26 | 48.0 | 13.0 | 8.0 | 31.0 | 0.010 | 0.20 | 0.00 | 0.05 | 0.11 | 892 | 2.5 | −5.3 | 115 | ≧120 |
| Sample 27 | 48.0 | 13.0 | 8.0 | 31.0 | 0.010 | 0.20 | 0.00 | 0.10 | 0.11 | 873 | 2.1 | −4.5 | 120 | ≧120 |
| Sample 28 | 48.0 | 13.0 | 8.0 | 31.0 | 0.010 | 0.20 | 0.00 | 0.30 | 0.11 | 598 | 1.3 | −2.6 | 140 | ≧120 |
| Sample 29 | 48.0 | 13.0 | 8.0 | 31.0 | 0.010 | 0.20 | 0.00 | 0.60 | 0.11 | 330 | 0.3 | −1.1 | 108 | ≧120 |
| Sample 30 | 48.0 | 13.0 | 8.0 | 31.0 | 0.010 | 0.20 | 0.00 | 0.70 | 0.11 | 307 | 0.8 | −0.7 | 94 | ≧120 |
| Sample 31 | 48.0 | 13.0 | 8.0 | 31.0 | 0.010 | 0.20 | 0.00 | 0.27 | 0.00 | 672 | 1.8 | −5.2 | 128 | ≧120 |
| Sample 32 | 48.0 | 13.0 | 8.0 | 31.0 | 0.010 | 0.20 | 0.00 | 0.27 | 0.05 | 648 | 1.5 | −4.8 | 138 | ≧120 |
| Sample 33 | 48.0 | 13.0 | 8.0 | 31.0 | 0.010 | 0.20 | 0.00 | 0.27 | 0.20 | 623 | 1.1 | −2.6 | 152 | ≧120 |
| Sample 34 | 48.0 | 13.0 | 8.0 | 31.0 | 0.010 | 0.20 | 0.00 | 0.27 | 1.00 | 373 | −4.3 | −2.5 | 159 | ≧120 |
| Sample 35 | 48.0 | 13.0 | 8.0 | 31.0 | 0.010 | 0.20 | 0.00 | 0.27 | 2.00 | 259 | −5.1 | −2.3 | 168 | ≧120 |

*In the column of Curie Point Tc, "≧120" indicates that Tc is not lower than 120° C.

As shown in Table 3, the samples 2 to 4, 7, 8, 11, 14, 15, 18, 19, 22 to 24, 27 to 29, 32 to 34 contain, as main components, Fe$_2$O$_3$ in an amount of 46.0 to 49.0 mol %, CuO in an amount of 4.0 to 11.0 mol %, ZnO in an amount of 30.1 to 33.0 mol % and NiO as the balance and also contain, as additional components, CoO in an amount of 0.005 to 0.03 wt %, Bi$_2$O$_3$ in an amount of 0.1 to 1.0 wt %, SiO$_2$ in an amount of 0.1 to 0.6 wt % and MgO in an amount of 0.05 to 1.0 wt % or talc in an amount of 0.1 to 2.0 wt % in place of SiO$_2$ and MgO based on the above main components. It has been confirmed that they have an initial permeability $\mu i$ at a frequency of 100 kHz of not lower than 200, a relative coefficient of temperature dependence $\alpha\mu ir$ of initial permeability in a range of ±5 (ppm/° C.), a rate of change in inductance under a pressure of 98 MPa in a range of ±5% and a Curie point of not lower than 120° C.

Meanwhile, the samples other than those listed above have failed to satisfy at least one the above four properties, that is, an initial permeability $\mu i$ at a frequency of 100 kHz of not lower than 200, a relative coefficient of temperature dependence $\alpha\mu ir$ of initial permeability in a range of ±5 (ppm/° C.), a rate of change in inductance under a pressure of 98 MPa in a range of ±5% and a Curie point of not lower than 120° C.

As described in detail above, according to the present invention, when the contents of the iron oxide, copper oxide, zinc oxide and nickel oxide as main components and the contents of the cobalt oxide, bismuth oxide and either a combination of silicon oxide and magnesium oxide or talc as additional components are within predetermined ranges, a ferrite material having high initial permeability, a gentle change in permeability along with a change in temperature, a small inductance change caused by a compressive stress and high stress resistance can be obtained. Further, since the content of cobalt oxide which is contained for the purpose of attaining a gentle change in permeability along with a change in temperature is a very expensive material is significantly low, an inexpensive ferrite material can be obtained.

INDUSTRIAL APPLICABILITY

The ferrite material of the present invention, for example, is molded into a core material having a predetermined shape, wrapped around by necessary windings and then resin-molded (resin-coated) to be used as a fixed inductor, a chip inductor or the like. These are used, for example, as a variety of electronic equipment in mobile communication devices such as a television, a video recorder, a portable telephone and an automobile telephone.

What is claimed is:

1. An NiCuZn-based ferrite material containing, as main components, an iron oxide in an amount of 47.0 to 50.0 mol % in terms of $Fe_2O_3$, a manganese oxide in an amount of 0.3 to 1.5 mol % in terms of $Mn_2O_3$, a copper oxide in an amount of 2.0 to 8.0 mol % in terms of CuO, zinc oxide in an amount of 30.1 to 33.0 mol % in terms of ZnO and a nickel oxide in mol % in terms of NiO as the balance, wherein 0.5 to 6.0 wt % of bismuth oxide in terms of $Bi_2O_3$, 0.1 to 2.0 wt % of silicon oxide in terms of $SiO_2$ and 0.05 to 1.0 wt % of magnesium oxide in terms of MgO are contained based on the main components.

2. The ferrite material of claim 1, which further contains 0.02 to 0.6 wt % of cobalt oxide in terms of CoO based on the main components.

3. An NiCuZn-based ferrite material containing, as main components, an iron oxide in an amount of 47.0 to 50.0 mol % in terms of $Fe_2O_3$, a manganese oxide in an amount of 0.3 to 1.5 mol % in terms of $Mn_2O_3$, a copper oxide in an amount of 2.0 to 8.0 mol % in terms of CuO, zinc oxide in an amount of 30.1 to 33.0 mol % in terms of ZnO and a nickel oxide in mol % in terms of NiO as the balance, wherein 0.5 to 6.0 wt % of bismuth oxide in terms of $Bi_2O_3$ and 0.15 to 3.2 wt % of talc are contained based on the main components.

4. The ferrite material of claim 3, which further contains 0.02 to 0.6 wt % of cobalt oxide in terms of CoO based on the main components.

5. The ferrite material of claim 1, which has an initial permeability $\mu i$ at a frequency of 100 kHz of not lower than 200.

6. The ferrite material of claim 3, which has an initial permeability $\mu i$ at a frequency of 100 kHz of not lower than 200.

7. An electronic part comprising an NiCuZn-based ferrite material, wherein the ferrite material contains, as main components, an iron oxide in an amount of 47.0 to 50.0 mol % in terms of $Fe_2O_3$, a manganese oxide in an amount of 0.3 to 1.5 mol % in terms of $Mn_2O_3$, a copper oxide in an amount of 2.0 to 8.0 mol % in terms of CuO, zinc oxide in an amount of 30.1 to 33.0 mol % in terms of ZnO and a nickel oxide in mol % in terms of NiO as the balance, and also contains 0.5 to 6.0 wt % of bismuth oxide in terms of $Bi_2O_3$, 0.1 to 2.0 wt % of silicon oxide in terms of $SiO_2$ and 0.05 to 1.0 wt % of magnesium oxide in terms of MgO based on the main components.

8. An electronic part comprising an NiCuZn-based ferrite material, wherein the ferrite material contains, as main components, an iron oxide in an amount of 47.0 to 50.0 mol % in terms of $Fe_2O_3$, a manganese oxide in an amount of 0.3 to 1.5 mol % in terms of $Mn_2O_3$, a copper oxide in an amount of 2.0 to 8.0 mol % in terms of CuO, zinc oxide in an amount of 30.1 to 33.0 mol % in terms of ZnO and a nickel oxide in mol % in terms of NiO as the balance, and also contains 0.5 to 6.0 wt % of bismuth oxide in terms of $Bi_2O_3$ and 0.15 to 3.2 wt % of talc based on the main components.

9. An NiCuZn-based ferrite material containing, as main components, an iron oxide in an amount of 47.0 to 50.0 mol % in terms of $Fe_2O_3$, a manganese oxide in an amount of 0.01 to 3.0 mol % in terms of $Mn_2O_3$, a copper oxide in an amount of 0.5 to 4.9 mol % in terms of CuO, zinc oxide in an amount of 1.0 to 23.0 mol % in terms of ZnO and a nickel oxide in mol % in terms of NiO as the balance, wherein 0.02 to 1.0 wt % of cobalt oxide in terms of CoO, 0.5 to 10.0 wt % of bismuth oxide in terms of $Bi_2O_3$, 0.1 to 2.0 wt % of silicon oxide in terms of $SiO_2$ and 0.05 to 1.0 wt % of magnesium oxide in terms of MgO are contained based on the main components.

10. An NiCuZn-based ferrite material containing, as main components, an iron oxide in an amount of 47.0 to 50.0 mol % in terms of $Fe_2O_3$, a manganese oxide in an amount of 0.01 to 3.0 mol % in terms of $Mn_2O_3$, a copper oxide in an amount of 0.5 to 4.9 mol % in terms of CuO, zinc oxide in an amount of 1.0 to 23.0 mol % in terms of ZnO and a nickel oxide in mol % in terms of NiO as the balance, wherein 0.02 to 1.0 wt % of cobalt oxide in terms of CoO, 0.5 to 10.0 wt % of bismuth oxide in terms of $Bi_2O_3$ and 0.15 to 3.2 wt % of talc are contained based on the main components.

11. The ferrite material of claim 9, which has an initial permeability $\mu i$ at a frequency of 100 kHz of not higher than 100.

12. The ferrite material of claim 10, which has an initial permeability $\mu i$ at a frequency of 100 kHz of not higher than 100.

13. An electronic part comprising an NiCuZn-based ferrite material, wherein the ferrite material contains, as main components, an iron oxide in an amount of 47.0 to 50.0 mol % in terms of $Fe_2O_3$, a manganese oxide in an amount of 0.01 to 3.0 mol % in terms of $Mn_2O_3$, a copper oxide in an amount of 0.5 to 4.9 mol % in terms of CuO, zinc oxide in an amount of 1.0 to 23.0 mol % in terms of ZnO and a nickel oxide in mol % in terms of NiO as the balance, and also contains 0.02 to 1.0 wt % of cobalt oxide in terms of CoO, 0.5 to 10.0 wt % of bismuth oxide in terms of $Bi_2O_3$, 0.1 to 2.0 wt % of silicon oxide in terms of $SiO_2$ and 0.05 to 1.0 wt % of magnesium oxide in terms of MgO based on the main components.

14. An electronic part comprising an NiCuZn-based ferrite material, wherein the ferrite material contains, as main components, an iron oxide in an amount of 47.0 to 50.0 mol % in terms of $Fe_2O_3$, a manganese oxide in an amount of 0.01 to 3.0 mol % in terms of $Mn_2O_3$, a copper oxide in an amount of 0.5 to 4.9 mol % in terms of CuO, zinc oxide in an amount of 1.0 to 23.0 mol % in terms of ZnO and a nickel oxide in mol % in terms of NiO as the balance, and also contains 0.02 to 1.0 wt % of cobalt oxide in terms of CoO, 0.5 to 10.0 wt % of bismuth oxide in terms of $Bi_2O_3$ and 0.15 to 3.2 wt % of talc based on the main components.

15. A ferrite material containing an iron oxide, a copper oxide, zinc oxide and a nickel oxide as main components, wherein the iron oxide is contained in an amount of 46.0 to 49.0 mol % in terms of $Fe_2O_3$, the copper oxide is contained in an amount of 4.0 to 11.0 mol % in terms of CuO, zinc oxide is contained in an amount of 30.1 to 33.0 mol % in terms of ZnO and the nickel oxide is contained as the balance, and based on the main components, 0.005 to 0.03 wt % of cobalt oxide in terms of CoO, 0.1 to 0.5 wt % of bismuth oxide in terms of $Bi_2O_3$, 0.1 to 0.6 wt % of silicon oxide in terms of $SiO_2$ and 0.05 to 1.0 wt % of magnesium oxide in terms of MgO are contained as additional components.

16. A ferrite material containing an iron oxide, a copper oxide, zinc oxide and a nickel oxide as main components, wherein the iron oxide is contained in an amount of 46.0 to 49.0 mol % in terms of $Fe_2O_3$, the copper oxide is contained in an amount of 4.0 to 11.0 mol % in terms of CuO, zinc oxide is contained in an amount of 30.1 to 33.0 mol % in terms of ZnO and the nickel oxide is contained as the balance, and based on the main components, 0.005 to 0.03 wt % of cobalt oxide in terms of CoO, 0.1 to 0.5 wt % of bismuth oxide in terms of $Bi_2O_3$ and 0.1 to 2.0 wt % of talc are contained as additional components.

17. The ferrite material of claim 15, which has an initial permeability at a frequency of 100 kHz of not lower than 200.

18. The ferrite material of claim 16, which has an initial permeability at a frequency of 100 kHz of not lower than 200.

19. The material of claim 15, which has a relative coefficient of temperature dependence of initial permeability in a range of ±5 (ppm/° C.).

20. The material of claim 16, which has a relative coefficient of temperature dependence of initial permeability in a range of ±5 (ppm/° C.).

21. The material of claim 15, which has a rate of change in inductance under a pressure of 98 MPa in a range of ±5%.

22. The material of claim 16, which has a rate of change in inductance under a pressure of 98 MPa in a range of ±5%.

23. An electronic part comprising an NiCuZn-based ferrite material, wherein the ferrite material contains, as main components, an iron oxide in an amount of 46.0 to 49.0 mol % in terms of $Fe_2O_3$, a copper oxide in an amount of 4.0 to 11.0 mol % in terms of CuO, zinc oxide in an amount of 30.1 to 33.0 mol % in terms of ZnO and a nickel oxide as the balance, and also contains, as additional components, 0.005 to 0.03 wt % of cobalt oxide in terms of CoO, 0.1 to 0.5 wt % of bismuth oxide in terms of $Bi_2O_3$, 0.1 to 0.6 wt % of silicon oxide in terms of $SiO_2$ and 0.05 to 1.0 wt % of magnesium oxide in terms of MgO based on the main components.

24. An electronic part comprising an NiCuZn-based ferrite material, wherein the ferrite material contains, as main components, an iron oxide in an amount of 46.0 to 49.0 mol % in terms of $Fe_2O_3$, a copper oxide in an amount of 4.0 to 11.0 mol % in terms of CuO, zinc oxide in an amount of 30.1 to 33.0 mol % in terms of ZnO and a nickel oxide as the balance, and also contains, as additional components, 0.005 to 0.03 wt % of cobalt oxide in terms of CoO, 0.1 to 0.5 wt % of bismuth oxide in terms of $Bi_2O_3$ and 0.1 to 2.0 wt % of talc based on the main components.

\* \* \* \* \*